(12) United States Patent
Zou et al.

(10) Patent No.: US 12,101,125 B2
(45) Date of Patent: Sep. 24, 2024

(54) METHOD OF OPERATING A BIDIRECTIONAL OPTICAL TRANSMISSION LINK AND CORRESPONDING OPTICAL TRANSMISSION LINK

(71) Applicant: Adtran Networks SE, Meiningen (DE)

(72) Inventors: Shihuan Zou, Munich (DE); Ross Saunders, Ottawa (CA); Thang Hoang, Nepean (CA)

(73) Assignee: Adtran Networks SE, Meiningen (DE)

( * ) Notice: Subject to any disclaimer, the term of this patent is extended or adjusted under 35 U.S.C. 154(b) by 36 days.

(21) Appl. No.: 17/980,005

(22) Filed: Nov. 3, 2022

(65) Prior Publication Data
US 2023/0136924 A1    May 4, 2023

(30) Foreign Application Priority Data
Nov. 4, 2021   (EP) .................................. 21206554

(51) Int. Cl.
*H04B 10/00* (2013.01)
*H04B 10/40* (2013.01)
(Continued)

(52) U.S. Cl.
CPC ........... *H04B 10/524* (2013.01); *H04B 10/40* (2013.01); *H04B 10/503* (2013.01)

(58) Field of Classification Search
CPC ................ H04B 10/40; H04B 10/2507; H04B 10/2513; H04B 10/25137; H04B 10/524;
(Continued)

(56) References Cited

U.S. PATENT DOCUMENTS

| 7,751,658 B2 | 7/2010 | Welch et al. |
| 8,687,969 B2 * | 4/2014 | Ekkizogloy ............ H04B 10/40 398/139 |

(Continued)

OTHER PUBLICATIONS

Eiselt et al., "Performance Comparison of 112-Gb/s DMT, Nyquist PAM4 and Partial-Response PAM4 for Future 5G Ethernet-based Fronthaul Architecture," Journal of Lightwave Technology, 2018, pp. 1807-1814, vol. 36, No. 10.
(Continued)

*Primary Examiner* — Hanh Phan
(74) *Attorney, Agent, or Firm* — The Webb Law Firm (57) ABSTRACT

The invention relates to a method and apparatus of operating a bidirectional optical transmission link. The optical transmission link includes a first and a second optical transceiver at a dedicated end of the optical transmission link and an optical path connecting the first and second optical transceiver. The optical transceivers apply the methods of converting an electrical digital transmit signal into an electrical PAM-n transmit signal, pre-emphasizing the electrical PAM-n transmit signal) by digital filtering and using the pre-emphasized electrical PAM-n signal$_2$) as modulating signal for optically modulating an optical carrier signal. The optical modulation method deployed is configured to create an optical PAM-n transmit signal with a positive or negative chirp. For initializing the optical transmission link (100), an initialization process is performed in which at least one loop including the following steps is run through creating, in the first optical transceiver, an optical PAM-n training transmit signal and transmitting it to the second optical transceiver, the optical PAM-n training transmit signal being created using an electrical PAM-n training transmit signal including a binary training sequence. Initial values for filter parameters are used for pre-emphasizing the electrical PAM-n training transmit signal and an initial value is used for a chirp (Continued)

parameter that defines the positive or negative chirp of the optical PAM-n training transmit signal receiving, in the second optical transceiver, the optical PAM-n training transmit signal as an optical PAM-n training receive signal using direct detection. The optical PAM-n training receive signal is converted into an electrical PAM-n training receive signal. The method includes obtaining sampled values of the electrical PAM-n training receive signal ($RP_{el,1}$) by sampling this signal at predetermined points in time; and using the sampled values obtained and corresponding sampled values of an ideal electrical PAM-n transmit signal to determine operating values for the filter parameters and an operating value for the chirp parameter.

15 Claims, 4 Drawing Sheets

(51) Int. Cl.
*H04B 10/50* (2013.01)
*H04B 10/524* (2013.01)

(58) Field of Classification Search
CPC .. H04B 10/503; H04B 10/0795; H04B 10/58; H04B 10/5057; H04B 10/50577; H04B 10/50575
USPC ....... 398/135, 136, 137, 138, 139, 158, 159, 398/33, 38, 25, 26, 27, 192, 193, 194, 398/195, 196, 197, 198, 199, 200, 201, 398/162, 202, 208, 209
See application file for complete search history.

(56) References Cited

U.S. PATENT DOCUMENTS

| 8,837,950 B2* | 9/2014 | Hosking | ............... H04B 10/40 |
| | | | 398/30 |
| 2018/0109318 A1 | 4/2018 | Castro et al. | |
| 2019/0149393 A1 | 5/2019 | Yu et al. | |

OTHER PUBLICATIONS

Gnauck et al., "Dispersion penalty reduction using an optical modulator with adjustable chirp", IEEE Photonics Technology Letters, 1991, pp. 916-918, vol. 3, No. 10.

Li et al., "Investigation on the equalization techniques for 10G-class optics enabled 25G-EPON", Optics Express, 2017, pp. 16228-16234, vol. 25, No. 14.

McGhan, D., "Electronic Dispersion Compensation", OFC 2006, paper OWK1.

Zou et al., "100G PAM-6 and PAM-8 Signal Transmission Enabled by Pre-Chirping for 10-km Intra-DCI Utilizing MZM in C-band", Journal of Lightwave Technology, 2020, pp. 3445-3453, vol. 38, No. 13.

* cited by examiner

METHOD OF OPERATING A BIDIRECTIONAL OPTICAL TRANSMISSION LINK AND CORRESPONDING OPTICAL TRANSMISSION LINK

CROSS-REFERENCE TO RELATED APPLICATION

This application claims priority to European Patent Application No. 21206554.4 filed Nov. 4, 2021, the disclosure of which is hereby incorporated by reference in its entirety.

BACKGROUND OF THE INVENTION

Field of the Invention

The invention relates to a method of operating a bidirectional optical transmission link and to a corresponding optical transmission link.

Description of Related Art

In the optical access networks, the demand for higher data rate keeps growing. At present, this is primarily caused by mobile fronthaul. Optical transceivers based on intensity modulation (IM) and direct detection (DD) are widely deployed in these systems due to the advantage of low costs. Coherent optical transceivers are not yet an option in a medium term for such applications due to their complexity and corresponding high costs.

Therefore, there is a high need for optical transmission systems using IM/DD, for example DWDM systems, to increase the data rate per wavelength while maintaining the reach. However, an increase in the data rate when using non-return-to-zero (NRZ) coded optical signals suffers from both bandwidth limitation of system components and chromatic dispersion of the optical path. The latter restriction is especially true when standard optical fibers are used and the optical transmission signals lie in the optical C-band, i.e. in the wavelength range between 1530 nm and 1565 nm.

In order to increase the data transmission rate to 25 Gb/s and beyond using IM/DD, current developments are focused on increasing the bandwidth of electrical drivers, optical modulators, lasers and receivers. However, even with such improved components, the use of standard C-band DWDM systems is limited as the transmission reach is significantly reduced due to the dispersion penalty. Alternatively, laser wavelengths within the O-band, i.e. within the wavelength range of 1260 nm to 1360 nm, are considered to avoid the chromatic dispersion, but the propagation loss is larger in the single-mode fiber and WDM as well as amplification is less mature. The above limitation is the essential obstacle to save the precious fiber resources for mobile fronthaul applications.

There is also academic research for providing optical transmission systems showing record-high data rate using advanced IM modulation formats, such as n-level pulse-amplitude modulation (PAM-n) and discrete multitone (DMT) modulation, using narrow-bandwidth components. However, these developments are still far from commercial readiness and require complicated digital signal processing on the receiver side (see N. Eiselt et al., "Performance Comparison of 112 Gb/s DMT, Nyquist PAM4 and Partial-Response PAM4 for Future 5G Ethernet-based Fronthaul Architecture," Journal of Lightwave Technology, vol. 36, no. 10, pp. 1807-1814, May 2018; Z. Li et al., "Investigation on the equalization techniques for 10G-class optics enabled 25G-EPON", Optical Express, vol. 25, no. 14, pp. 16228-16234, July 2017).

An early tutorial paper describes an approach to use a communication channel from the far-end transceiver of an optical transmission link to optimize an equalizer (more correctly designated as a pre-emphasizer) that is provided in the transmitter at the near end. However, the approach uses the far end bit error rate (BER) to estimate the link penalty. This, however, is a rather inaccurate method as it comprises an indirect calculation and takes longer time to converge. It is shown in this paper that the transmitter pre-compensation clearly outperforms the equalization at the receiver side (see D. McGhan, "Electronic Dispersion Compensation", OFC 2006, paper OWK1).

SUMMARY OF THE INVENTION

Thus, it is an object of the present invention to provide a method of operating a bidirectional optical transmission link which comprises an initialization method or process for automatically determining transmission parameters which contribute to reduce the inter-symbol interference and thus the BER. It is a further object of the invention to provide a corresponding transmission link.

The invention achieves these objects with the combinations of features as described herein. Further embodiments are apparent from the dependent claims.

The invention starts from the finding that both the bandwidth limitations of an optical transmission link comprising an optical transceiver at each end of an optical path, e.g. a standard optical fiber, that are introduced by the system components and the chromatic dispersion (CD) of the optical path can be pre-compensated or pre-emphasized at the respective transmitting side or transceiver, respectively. The method according to the invention allows to determine pre-compensation parameters, especially filter coefficients of a digital filter provided in the transmitting path and a chirp parameter that defines a positive or negative chirp created by an electro-optical converter, using the same information that is obtained at the receiving side or transceiver, respectively. According to the invention, the pre-compensation parameters are automatically determined during an initialization process for the optical transmission link. As a result, the invention contributes to reducing the transceiver costs while improving the performance of the optical transmission link, especially the reach of the transmission link. It shall be noted that within this description, the technical terms "pre-compensation" at the transmitting side of the optical transmission link and "pre-emphasis" are used equivalently.

According to the invention, the optical transmission link comprises a first and a second optical transceiver at a dedicated end of the optical transmission link and an optical transmission path connecting the first and second optical transceiver. The optical transceivers apply the methods of converting an electrical digital (usually binary) transmit signal into an electrical PAM-n transmit signal, pre-emphasizing the electrical PAM-n transmit signal by digital filtering and using the pre-emphasized electrical PAM-n signal as modulating signal for optically modulating an optical carrier signal, wherein the optical modulation method deployed is configured to create an optical PAM-n transmit signal with a positive or negative chirp. For initializing the optical transmission link, an initialization process is performed in which at least one loop comprising the following steps is run through:

creating, in the first optical transceiver, an optical PAM-n training transmit signal and transmitting it to the second optical transceiver, the optical PAM-n training transmit signal being created using an electrical PAM-n training transmit signal comprising a binary training sequence, wherein initial values for filter parameters (that may also be designated as "equalization weights") are used for pre-emphasizing the electrical PAM-n training transmit signal and wherein an initial value is used for a chirp parameter that defines the positive or negative chirp of the optical PAM-n training transmit signal;

receiving, in the second optical transceiver, the optical PAM-n training transmit signal as an optical PAM-n training receive signal using direct detection, wherein the optical PAM-n training receive signal is converted into an electrical PAM-n training receive signal;

obtaining sampled values of the electrical PAM-n training receive signal by sampling this signal at predetermined points in time;

using the sampled values obtained and corresponding sampled values of an ideal electrical PAM-n transmit signal to determine operating values for the filter parameters and an operating value for the chirp parameter.

The operating values for the filter parameters and the operating value for the chirp parameter are deployed during normal operation of the optical transmission link in the first optical transceiver.

Of course, this method can be applied for determining the pre-compensation parameters, i.e. the operating values for the filter equalization and the operating value for the chirp parameter, of both optical transceivers by performing this method twice, namely, for each transmission direction of the bidirectional optical transmission link.

According to an embodiment of the invention, the operating values for the filter parameters and the operating value for the chirp parameter are determined by the second optical transceiver and transmitted, via a communication channel, preferably an out-of-band communication channel, to the first optical transceiver, wherein the second optical transceiver knows the filter structure of the digital filter in the first optical transceiver and the ideal electrical PAM-n transmit signal or respective ideal sampled values. This requires to transmit only a few values, namely, the (final or preliminary) operating values for the filter parameters and the chirp parameter from the second to the first optical transceiver.

According to another embodiment, the operating values for the filter parameters and the operating value for the chirp parameter are determined by the first optical transceiver, wherein the sampled values of the electrical PAM-n training receive signal are transmitted, via a communication channel, preferably an out-of-band communication channel, to the first optical transceiver. In this case, a specific knowledge of the optical transceiver at the receiving end concerning the digital filter of the optical transceiver at the transmitting end is not required (of course, transceiver at the transmitting end knows the ideal electrical PAM-n transmit signal or respective ideal sampled values). However, a plurality of values, namely, the sampled values of the electrical PAM-n training receive signal, needs to be transmitted from the second to the first optical transceiver. If, for example a PAM-n training signal comprising 4096 symbols is used during the initialization process, a corresponding number of sampled values is to be transmitted to the respective other end.

According to an embodiment of the invention, the sampled values obtained and the ideal sampled values are used as input information for an algorithm that is configured to output operating values for the filter parameters, wherein, preferably, the sampled values obtained and the ideal sampled values are normalized (e.g. using the respective highest value of each set of values).

The algorithm may be, in one alternative, a zero-forcing algorithm, wherein the above-mentioned loop is run through preferably only once. As a zero-forcing algorithm is in principle configured to determine the inverse of the frequency response of the optical transmission link and thus completely eliminates inter-symbol interference (ISI), this alternative is disadvantageous if the channel frequency response has small magnitudes or even zeroes in the interesting range. The reason therefore is that the inverse of the frequency response in such ranges becomes high or even infinite so that noise components in these ranges are greatly amplified.

According to another alternative, the algorithm may be a least mean square error (LMSE) algorithm, wherein the above-mentioned loop is run through multiple times until the mean square error (MSE) between the sampled values obtained and the corresponding sampled values of the ideal electrical PAM-n transmit signal (that is determined in each pass of the loop) is interpreted as being an LMSE, wherein this interpretation can be made if the MSE reaches a minimum or is lower than a predetermined threshold value or if the MSE obtained in the current loop deviates from the MSE obtained in the previous loop by less than a predetermined threshold value. An LMSE algorithm is a more balanced algorithm and does not usually eliminate ISI completely but instead minimizes the total power of the noise and ISI components in the output.

According to a further embodiment of the invention, a change of the chirp parameter value is determined from a predetermined dependency of the chirp parameter from a remaining MSE between the sampled values obtained and the corresponding sampled values of the ideal electrical PAM-n transmit signal that is determined when using the operating values for the filter parameters and keeping the initial operating value for the chirp parameter.

This relationship may be stored in a control device of the optical transceiver that carries out the respective calculations.

Thus, according to the present invention, both the operating values for the filter parameters and the operating value for the chirp parameter are determined on the basis of the same information, namely, the two sets of sampled values of the electrical PAM-n receive signal and the ideal electrical PAM-n transmit signal.

The predetermined dependency of the chirp parameter from the remaining MSE can be obtained by a factory calibration process using an optical calibration transmission link comprising the first and second optical transceiver and two or more optical paths of known dispersion load or a single optical path comprising an adjustable dispersion component, or by simulating such a factory calibration process. Of course, a simulation is only an adequate substitute for a calibration process that comprises a measurement of the remaining MSE if the properties of the components are known with sufficient accuracy.

Such a factory calibration process may comprise two stages. In one stage, the following steps are carried out:

determining, for two or more different CD loads, the respective (optimum) operating values for the filter parameters using the respective algorithm as described above (wherein the initial value for the chirp parameter is kept at a fixed value, preferably zero) and determining, for each CD load, the remaining MSE between the (normalized) sampled values of the electrical PAM-n receive signal and the (normalized) sampled values of the ideal electrical PAM-n transmit signal, and using the values for the MSE and the (preknown) values for the CD loads for determining a relationship between the CD load and the MSE.

This first calibration dependency can be used, during an initialization of the optical transmission link, to determine the actual CD load from the MSE that remains after having optimized the filter parameters as explained above.

In an additional stage of the calibration process, the following steps are carried out:

determining or measuring the bit error rate depending on a varying CD load (by using a plurality of differing optical paths introducing a respective known CD load or by using an optical dispersion component being controllable as to its CD load) and on a varying value for chirp parameter at a predetermined constant value for the average power of an optical PAM-n receive signal; during this step, for each measurement of the BER for a selected pair of values for the chirp parameter and the CD load, the filter parameter values optimized;

determining, for each of selected values for the CD load, a value of the chirp parameter at which the bit error rate is at a minimum; and determining a relationship between the CD load and the chirp parameter using pairs of values each comprising a selected value for the CD load and a corresponding value for the chirp parameter.

This second calibration dependency can be used, during an initialization of the optical transmission link, to determine an optimum value for the chirp parameter from the CD load value that has been determined from the first calibration dependency.

Thus, the relationship between the CD load and the MSE can be used during the initialization process for determining the CD load once the operating values for the filter parameters have been determined using a selected algorithm, e.g. an LMSE algorithm. The relationship may be stored in the respective optical transceiver, especially in the control device thereof, e.g. as a two-dimensional table or an analytical dependency.

Likewise, the relationship between the CD load and the chirp parameter may be stored in the respective optical transceiver, especially in the control device thereof, e.g. as a two-dimensional table or an analytical dependency.

It is of course also possible to combine these two relationships to a single relationship between the chirp parameter and the MSE.

BRIEF DESCRIPTION OF THE DRAWINGS

In the following, the invention will be described in more detail with reference to the drawings. In the drawings.

DESCRIPTION OF THE INVENTION

Figure 1:
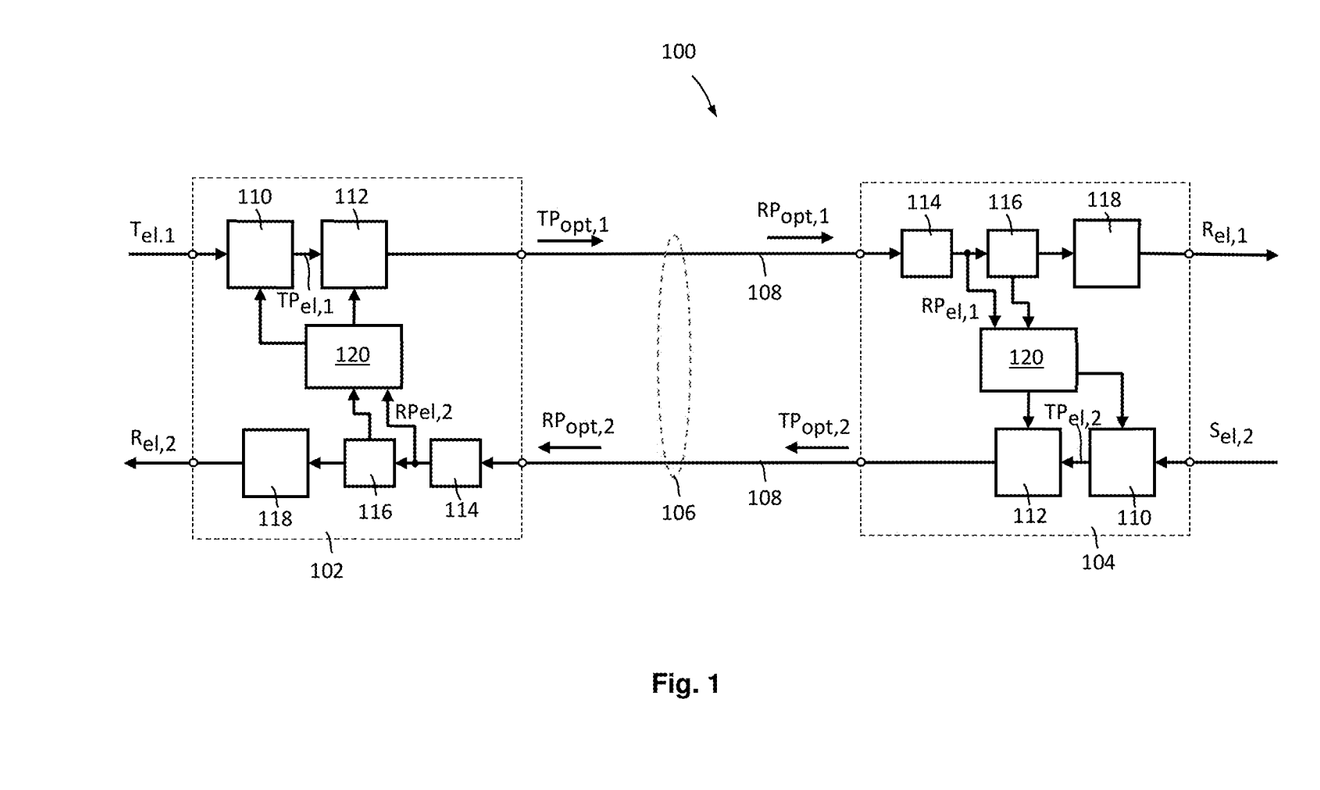
FIG. 1 shows a schematic block diagram of an optical transmission link according to an embodiment of the present invention.

FIG. 1 shows a schematic block diagram of a bidirectional optical transmission link 100 comprising a first and a second optical transceiver 102, 104, which are connected to an optical path 106. The optical path 106 comprises, in the embodiment shown, a separate optical fiber 108 for each of the transmission directions. It is, however, noted that instead of two separate optical fibers (or generally any type of optical paths) a single optical fiber (or generally any type of optical path) may be used for both transmission directions. The separate optical paths within each of the optical transceivers 102, 104 and the single optical path can be connected to the respective single optical path by an appropriate passive optical means, e.g. an optical diplexer or circulator.

The first optical transceiver 102 is configured to receive an electrical digital transmit signal $T_{el,1}$ at a local input port and converts this signal into an optical PAM-4 transmit signal $TP_{opt,1}$, which is fed to the respective optical fiber 108 at a remote transmit port of the optical transceiver 1. The optical PAM-4 transmit signal $TP_{opt,1}$ travels via the optical fiber 108 and encounters a respective attenuation and chromatic dispersion (other transmission characteristics of the optical fiber, e.g. nonlinear effects, are neglected within this description) before it is received as optical PAM-4 receive signal $RP_{opt,1}$ at a remote receive port of the optical transceiver 104. The optical transceiver 104 converts the optical PAM-4 receive signal $RP_{opt,1}$ into an electrical digital receive signal $R_{el,1}$. The electrical digital transmit and receive signals $T_{el,1}$, $R_{el,1}$ may be binary digital signals, e.g. in the form of NRZ coded signals.

Likewise, the second optical transceiver 104 receives an electrical digital transmit signal $S_{tx,2}$ at a local input port and converts this signal into an optical PAM-4 transmit signal $TP_{opt,2}$. This signal is supplied to the further optical fiber 108 at a remote transmit port of the optical transceiver 104. The further optical fiber 108 guides the optical PRM-4 transmit signal in the direction to the first optical transceiver 1, wherein the signal is received as optical PAM-4 receive signal $RP_{opt,2}$ at a remote receive port of the optical transceiver 102. The optical transceiver 102 converts this signal into an electrical digital receive signal $R_{el,2}$.

It is noted that, even if the embodiments described with reference to the drawings use a PAM-4 coding for the transmission of the optical signals over the optical path 106, any arbitrary PAM-n coding is appropriate to realize the present invention.

As already mentioned above, the signal transmission quality between the local input and output ports of the optical transceivers 102, 104 is decisively determined by both the bandwidth of the system components comprised by the optical transceivers 102, 104 and the attenuation and chromatic dispersion of the optical path, i.e. the optical fibers 108.

Each of the optical transceivers 102, 104 comprises the identical components, namely, a transmit signal processing unit 110 and an electro-optical converter 112 provided in a transmit path, a opto-electrical converter 114, a signal detector 116 and a receive signal converter 118 provided in a receive path and a control device 120 that is connected to a control port of the transmit signal processing unit 110, a control port of the electro-optical converter 112, an output port of the opto-electrical converter 114 and a control port of the receive signal converter 118.

The transmit signal processing units 110 convert the respective electrical digital transmit signal $T_{el,1}$, $T_{el,2}$ into a corresponding electrical PAM-4 transmit signal $TP_{el,1}$ $TP_{el,2}$, which is converted into the respective optical PRM-4 transmit signal $TP_{opt,1}$, $TP_{opt,1}$ by the corresponding electro-optical converter 112. As explained below, the electro-optical converters 112 are configured to introduce a predetermined positive or negative optical chirp into the respective optical PAM-4 transmit signal $TP_{opt,1}$, $TP_{opt,1}$.

The optical converters 112 may be realized as directly modulated lasers, which may provide an additional chirp control port configured to receive a respective chirp control signal created by the control device 120. In a further preferred alternative, the electro-optical converter is realized by a laser that creates an optical CW carrier signal and an optical modulator that is configured to modulate the optical CW carrier signal. In this alternative, the optical modulator is configured to introduce a controllable positive or negative chirp into the respective optical PAM-4 transmit signal $TP_{opt,1}$, $TP_{opt,1}$.

The control device 120 further controls at least a part of the signal processing properties of the transmit signal processing unit 110. Especially, as will be described below, the transmit signal processing unit 110 comprises a digital filter which is configured to pre-emphasize an electrical PAM-4 transmit signal $TP_{el,1}$, $TP_{el,2}$ created by the transmit signal processing unit 110. In the following, the pre-emphasized and the non-pre-emphasized electrical PAM-4 transmit signals will both be designated with the reference signs $TP_{el,1}$, $TP_{el,2}$, respectively.

In the receiving arm of each optical transceiver 102, 104, the respective opto-electrical converter receives the respective optical PAM-4 receive signal $RP_{opt,1}$ $RP_{opt,2}$ and converts it into an electrical PAM-4 receive signal $RP_{el,1}$ $RP_{el,2}$. The signal detector 116 samples the electrical PAM-4 receive signal $RP_{el,1}$ $RP_{el,2}$ at predetermined sampling points in time. The sampled values are fed to the receive signal converter 118 which is configured to convert these values into an electrical digital receive signal $R_{el,1}$, $R_{el,2}$.

As mentioned above, the transmit signal processing unit 110 is configured to pre-emphasize the electrical PAM-4 transmit signal $TP_{el,1}$, $TP_{el,2}$ and the electro-optical converter 112 is configured to add a positive or negative chirp to the optical PAM-4 transmit signal $TP_{opt,1}$, $TP_{opt,2}$. In this way, it is possible to at least partially compensate bandwidth limitations that are introduced by the system components and the linear dispersion, especially the chromatic dispersion, introduced by the optical path 106.

Figure 2:
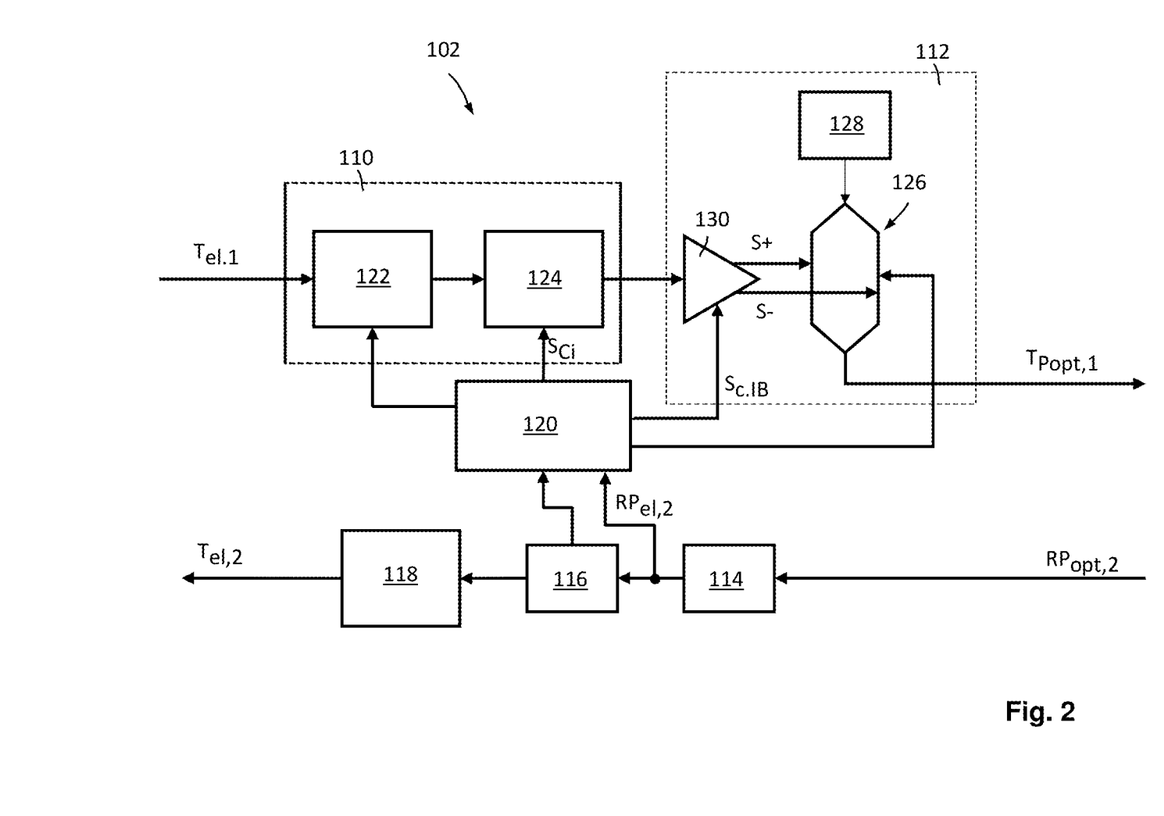
FIG. 2 shows a more detailed schematic block diagram of an optical transceiver of the optical transmission link in FIG. 1.

In the following, a more detailed embodiment of an optical transceiver 102, 104 will be described with reference to FIG. 2. The structure of an optical transceiver according to FIG. 2 may, of course, be used for both optical transceivers 102, 104 shown in FIG. 1. However, for simplicity, the optical transceiver in FIG. 2 is designated with the reference sign 1 that has previously been used for the first optical transceiver 1 in FIG. 1. Of course, this description can correspondingly be transferred to the second optical transceiver 104 according to FIG. 1.

According to the more detailed block diagram of FIG. 2, the optical transceiver 102 comprises a transmit processing unit 110 consisting of a transmit signal converter 122 configured to convert the electrical digital transmit signal $T_{el,1}$ into the electrical PAM-4 transmit signal and a digital filter 124 configured to pre-emphasize the electrical PAM-4 transmit signal in a predetermined way.

Preferably, the digital filter 124 is realized as a FIR filter as this filter type is simpler to design and reveals a high stability than other types of digital filters, especially infinite impulse response (IIR) filters. Preferably, the digital filter 124 may be realized as a 3-tap FIR filter, the filter properties of which are determined by three tap coefficients.

Further, the more detailed structure of the optical transceiver 1 shown in FIG. 2 comprises an electro-optical converter 112 that is realized as a dual-drive MZM 126 that modulates the optical CW carrier signal created by an optical source 128, preferably a laser. Further, the electro-optical converter 112 comprises an electrical driver 130 which is configured to receive the pre-emphasized electrical PAM-4 transmit signal and to convert this signal into appropriate driving signals S+ and S− for controlling a respective phase shifter provided in each arm of the dual-drive MZM (not shown). As the structure and functionality of a dual-drive MZM is well known, it is not necessary to include a more detailed description here. Instead, reference is made to suitable prior art publications.

It is also well known that an MZM can be controlled in such a way that a desired arm imbalance is achieved, i.e. the optical average power is controlled to be different in each of the arms. Such an imbalance can be reached in different ways: In one alternative, the imbalance may be created by the electrical driver 130. In this alternative, the electrical driver creates driving signals S+ and S− for each arm that reveal a different maximum amplitude. In another alternative, the arm imbalance may be achieved by providing an optical controllable attenuator in one of the arms. It is also possible to use a single-drive MZM and a controllable optical attenuator in one of the arms in order to achieve a controllable chirp functionality of the MZM.

In practice, it is advantageous to bias the MZM at the quadrature point and to use a swing for driving signals S+ and S− that represent the digital filter electrical PAM-4 transmit signal $TP_{el,1}$ which matches the voltage V-pi of the MZM, i.e. the voltage at which a phase shift of pi is achieved by the respective phase shifter.

As apparent from FIG. 2, the control device 120 is configured to control the arm driving imbalance of the MZM 130 by means of a control signal $S_{c,IB}$ that is supplied to the electrical driver 130.

The control device 120 is further configured to supply values for the filter parameters, especially values for the tap coefficients of the preferably used FIR filter, to the digital filter 124. In FIG. 2, this control signal is designated by the reference sign $S_{Ci}$.

The control device 120 is also capable of modulating the bias voltage of the MZM according to a low-frequency signal (low-frequency here means at least two, preferably three orders lower than the symbol rate of the PAM-4 signal to be transmitted). In this way, and out-of-band communication channel (OOBC) can be realized as a low-frequency modulation component of the optical PAM-4 transmit signal $TP_{opt,1}$. This OOBC makes it possible to transmit control information to the respective other optical transceiver 104.

In order to initialize the optical transmission link 100 (FIG. 1), the control device 120 of one or both optical transceivers 102, 104 is capable of starting an initialization procedure. This can be done by transmitting a start command to the control device 120 of the respective other optical transceiver 104, 102. This can be done by using the OOBC. During the initialization procedure, specific training signals are transmitted between the optical transceivers 102, 104 as explained below.

As apparent from FIG. 2, the receiving arm of the optical transceiver 1 comprises the identical components described above with reference to FIG. 1. However, taking into account the above description of the OOBC, it now becomes clear that the arrow between the output port of the opto-electrical converter 114 indicates the OOBC. In order to demodulate the OOBC, the electrical PAM-4 receive signal $TP_{el,2}$ that is output by the opto-electrical converter 114 is fed to the control device 120. The control device 120 comprises a low-pass filter (not shown) and an appropriate signal processing unit for demodulating and processing the OOBC signal component comprised in the electrical PAM-4 receive signal $TP_{el,2}$.

Also the signal detector 116 is connected the control device 120. Via this connection, the signal detector 116 is able to transmit sampled values of an electrical PAM-4 receive signal $TP_{el,2}$ to the control device 120 during an initialization procedure.

In the following, an initialization procedure for the optical transmission link 100 (FIG. 1) that comprises a first and a second optical transceiver 102, 104 as shown in FIG. 2 will be described in detail. However, the general functionality can be transferred to any other embodiment of an optical transceiver 102 or 104 that is capable of creating an optical PAM-n that comprises pre-emphasis and chirp.

As explained above, an initialization procedure will be started by one of the optical transceivers 102, 104 if necessary, e.g. if the optical transmission link has been newly installed or is again put into operation after interruption.

During the initialization procedure and optical PAM-4 training transmit signal $TP_{opt,1}$ (or general, a PAM-n training transmit signal) is created by the first optical transceiver 102 (for simplicity, in the following, the optical and electrical training signals are designated by the same reference signs as the optical training signals during a normal operation of the transmission link). For this purpose, the control device 120 controls the transmit signal converter 122 to create an electrical PAM-4 training transmit signal $TP_{el,1}$ instead of converting the electrical digital transmit signal $T_{el,1}$ into a corresponding electrical PAM-4 signal $TP_{el,1}$. The control device 120 may be configured to feed to the transmit signal converter 122 a respective training bit sequence that is to be used to create the electrical PAM-4 signal $TP_{el,1}$ at the same symbol rate that is used for the electrical PAM-4 signal $TP_{el,1}$ during normal operation.

At the beginning of the initialization procedure, the control device 120 sets the values for the filter parameters, e.g. the tap coefficients for a 3-tap FIR filter, and the value for the chirp parameter, e.g. the arm driving imbalance of the MZM, to arbitrary but reasonable initial values.

According to an embodiment of the invention, the initial value for the chirp parameter may be set to 0, i.e. the respective optical PAM-4 training transmit signal $TP_{opt,1}$ is created without chirp. It is of course also possible, to start the initialization procedure with initial values for the digital filter that not introduce any pre-emphasis into the respective electrical PAM-4 training transmit signal $TP_{el,1}$.

This optical PAM-4 training transmit signal $TP_{opt,1}$ is received by the second optical transceiver 104 as optical PAM-4 training receive signal $RP_{opt,1}$, wherein this signal is converted into a corresponding electrical PAM-4 training receive signal $RP_{el,1}$. The signal detector 116 of the second optical transceiver 104 samples signal and feeds the sampled values of the electrical PAM-4 training receive signal $RP_{el,1}$ to the control unit 120.

The control unit 120 of the second optical transceiver 104 knows the (sampled) values of an ideal electrical PAM-4 training transmit signal, which corresponds to the pre-set amplitude levels of the PAM-4 coding used.

in order to compare the sampled values of the electrical PAM-4 training receive signal $RP_{el,1}$ and corresponding values of the ideal PAM-4 training transmit signal, both sets of values are normalized to the corresponding highest value.

In a next step, the control device 120 of the second optical transceiver 104 uses the two sets of (sampled) values based on the electrical PAM-4 training receive signal $RP_{el,1}$ and on the ideal electrical PAM-4 training transmit signal as input values of a feed forward equalization (FFE) algorithm. This algorithm may be based on zero forcing LMSE methods. Such equalization methods are widely known so that it is not necessary to go into further detail in this respect.

If a zero forcing algorithm is applied, operating values for the filter parameters, e.g. the tap coefficients of FIR filter, are the direct result of the respective calculation that is carried out by the control device 120 of the second optical transceiver 104.

If a LMSE algorithm is applied, the control device 120 calculates a respective set of values for the filter parameters and the MSE for the respective electrical PAM-4 training receive signal $RP_{el,1}$ that has been received in the respective loop (the LMSE algorithm is an iterating algorithm). In a next step, the filter parameter values are transmitted to the first optical transceiver 102 via the OOBC. The control device of the first optical transceiver sets the digital filter 124 to the values for the filter parameters received in the current loop.

Then, the next loop is initiated, wherein the control device 120 of the first optical transceiver 102 again creates an optical PAM-4 training transmit signal $TP_{opt,1}$ using the values for the filter parameters that have been obtained in the previous loop. The second optical transceiver 104 receives the respective optical PAM-4 training receive signal $RP_{opt,1}$, converts it into a corresponding electrical PAM-4 training receive signal $RP_{el,1}$, samples this signal and calculates new values for the filter parameters and a new value for the MSE. If the value for the MSE meets a termination criterion, the LMS algorithm is finished. The values for the filter parameters that have been calculated in the last loop are used as operating values for the filter parameters during a normal operation of the optical transmission link 100.

In both cases, i.e. the use of a zero forcing algorithm or an LMSE algorithm, or generally spoken, for any FFE algorithm that might be applied, a remaining MSE is calculated by the control device 120 of the second optical transceiver 104. This value of the remaining MSE, i.e. the MSE value that is determined when the operational values for the filter parameters are used, can be used to determine the value for the chirp parameter as described below. It shall be noted in this respect that the remaining MSE is a differential value and depends on the initial value for the chirp parameter. That is the initial chirp parameter value determines the (remaining) MSE that is output by the algorithm and thus the (remaining) CD load that is to be compensated.

Next, in a first step, the relationship between the CD load introduced by the optical path and the chirp parameter and the relationship between the CD load and the (remaining) MSE (between sampled values of an appropriate electrical PAM-4 receive signal $RP_{el,2}$ and an ideal PAM-4 transmit signal) will be explained with reference to FIGS. 3 and 4.

Figure 3:
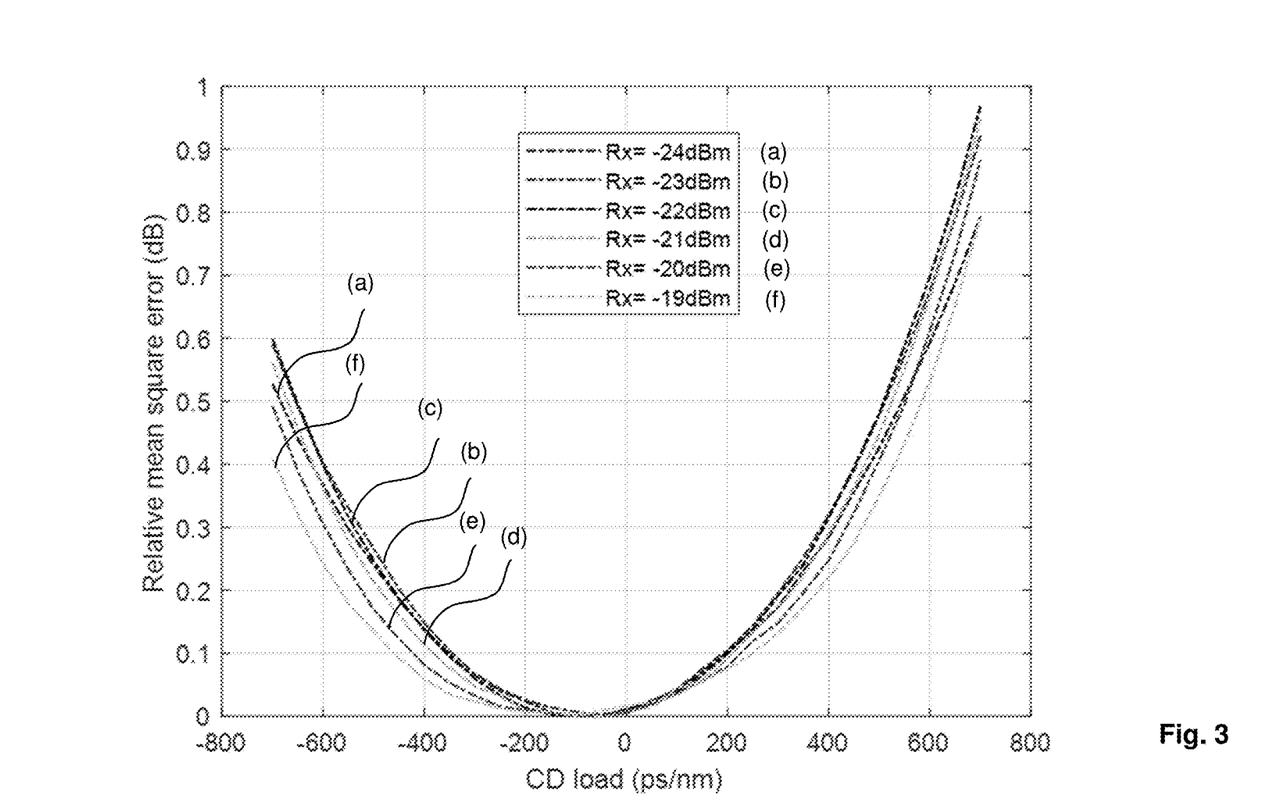
FIG. 3 shows a diagram visualizing the dependency of the relative MSE on the CD load introduced by the optical path.

FIG. 3 shows a diagram with various curves for the dependency of the relative (remaining MSE) given in dB on the CD load that is introduced by the optical path in ps/nm. The MSE has been normalized to the lowest minimum absolute value for the MSE. The different curves shown have been determined by simulation for differing (but constant) average powers of the optical PAM-4 receive signal (e.g. an optical PAM-4 training receive signal $RP_{opt,1}$). Of course, these dependencies (or one or more selected dependencies for differing average powers) can be inverted in order to determine the CD load depending on the MSE. These dependencies are determined for a chirp parameter value that equals a fixed value, preferably zero (as in case of the diagram shown in FIG. 3).

As apparent from FIG. 3, the inverted dependencies, i.e. the dependencies of the CD load on the MSE, are not unique as negative and positive values of the MSE can correspond to two different CD load values. However, in practice, this is generally no major problem as the general properties of the optical path (in most cases the optical fiber) will be known, especially whether the chromatic dispersion is positive or negative in the interesting range. For example, in all cases, in which the optical path is realized by a standard optical fiber, the chromatic dispersion can only assume positive values in the interesting range.

This dependency of the CD load on the (remaining) MSE can be stored in the control device 120, e.g. in the form of analytical expressions or tables (for one of more average powers of the electrical PAM-4 (training) receive signal $RP_{el,2}$). This dependency can be used, during an initialization process of the optical transmission link, to determine the actual CD load from the (remaining) MSE by performing the process for determining the optimized filter parameter values.

Figure 4:
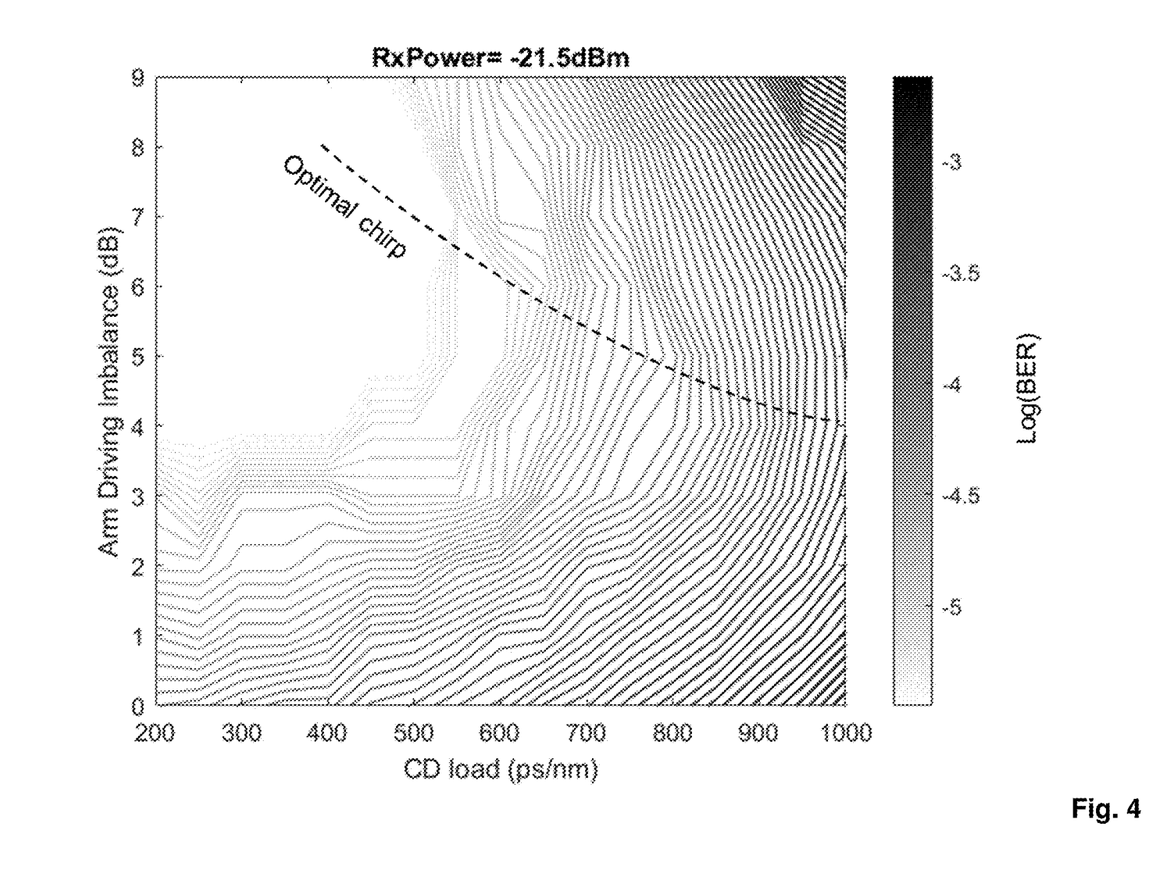
FIG. 4 shows a diagram visualizing the dependency of the BER depending on the arm driving imbalance of a dual drive modulator MZM according to the embodiment in FIG. 1 and the CD load introduced by the optical path.

FIG. 4 shows a diagram visualizing the dependency of the BER on the CD load and the chirp parameter for a transceiver embodiment according to FIG. 2, i.e. a transceiver using an MZM for introducing chirp by an arm driving imbalance (of course, any other method of effecting an imbalance of the optical average power in the two MZM arms can be used as mentioned above). Logarithmic scales are used for the arm driving imbalance and the BER. This diagram can be determined by measuring the BER depending on the CD load and the chirp parameter (that corresponds to the imbalance of the optical average power in the MZM arms), while, for each BER measurement (depending on selected values for the CD load and the chirp parameter), in a first step, the filter parameters are optimized as explained above.

The dashed curve in FIG. 4 shows the course of the optimal chirp, i.e the dependency of the arm driving imbalance on the CD load for the respective minimum BER. As FIG. 4. shows the BER in the form of curves for constant values of the BER, this dependency can be determined by selecting a (constant) CD load and determining the minimum of the remaining two-dimensional dependency of arm driving imbalance on the BER. In this way, for each value of the CD load a corresponding value of the arm driving imbalance can be determined at which the BER is at a minimum. The dependency of the arm driving imbalance (or generally: the chirp parameter) on the CD load can then be used to determine the optimum (relative) value of the arm driving imbalance.

Of course, also the dependency of the chirp parameter on the CD load can also be stored in the control device 120 in the form of an analytical dependency or a table.

As mentioned above, the two dependencies according to FIGS. 3 and 4 can be determined during a factory calibration process.

It is also possible to combine the two dependencies to a single dependency of the chirp parameter (e.g. the arm driving imbalance) on the (remaining) MSE (for one or more given average powers of the signal received).

According to an embodiment of the invention, the initialization procedure is started with a chirp value of zero. In this way, the lacking uniqueness of the dependency of the chirp parameter on the CD load can be avoided at least in cases in which the general dispersion properties of the optical path are known. For example, it a standard (single-mode) fiber is used, it is clear that the CD load can only be positive, provided that no over-pre-compensation is effected when the initialization process starts, which is guaranteed if the process starts with no pre-compensation.

It shall finally be noted that the calculations (or generally spoken the actions required to determine the values of the filter parameters and the values of the chirp parameter) can also be performed by the control device of the first optical transceiver 102. In this case, it is required to transmit the sampled values of the electrical PAM-4 training receive signal $RP_{el,1}$ from the second optical transceiver 104 to the first optical transceiver 102 via the OOBC.

It is also possibly to distribute these actions on the two control devices 120. For example, the filter parameter values may be determined and the calculation of the (remaining) MSE may be carried out by the control device 120 of the second optical transceiver 104 and the chirp parameter value may be determined by the control device 120 of the first optical transceiver 102, wherein this control device receives the MSE value (and of course the filter parameter values) form the control device 120 of the second optical transceiver 104.

Of course, the roles of the first and second optical transceiver described above may also be exchanged.

In this way, the invention makes it possible to increase the data rate (while maintaining the reach and the BER required) by determining, during an initialization procedure, optimum parameters for the pre-emphasis by means of a digital filter and for the chirp by means of controlling the electro-optical converter.

LIST OF REFERENCE SIGNS 100 optical transmission link
102 first optical transceiver
104 second optical transceiver
106 optical path
108 optical fiber
110 transmit signal processing unit
112 electro-optical converter
114 opto-electrical converter
116 signal detector
118 receive signal converter
120 control device
122 transmit signal converter
124 digital filter
126 Mach-Zehnder modulator (MZM)
128 optical source
130 electrical driver
$R_{el,1}$ electrical digital receive signal
$R_{el,2}$ electrical digital receive signal
$RP_{el,1}$ electrical digital receive signal
$RP_{el,2}$ electrical digital receive signal
$RP_{opt,1}$ optical digital receive signal
$RP_{opt,2}$ optical digital receive signal
S+ driving signal
S− driving signal
$S_{Ci}$ control signal (values of the parameters)
$S_{c,IB}$ control signal (values for chirp parameter/arm driving imbalance)
$T_{el,1}$ electrical digital transmit signal $T_{el,2}$ electrical digital transmit signal
$TP_{el,1}$ electrical digital transmit signal
$TP_{el,2}$ electrical digital transmit signal
$TP_{opt,1}$ optical digital transmit signal
$TP_{opt,2}$ optical digital transmit signal

The invention claimed is:

1. A method of operating a bidirectional optical transmission link,
   (a) wherein the optical transmission link comprises a first and a second optical transceiver at a dedicated end of the optical transmission link and an optical path connecting the first and second optical transceiver,
   (b) wherein the optical transceivers apply the methods of converting an electrical digital transmit signal ($T_{el,1}$, $T_{el,2}$) into an electrical PAM-n transmit signal ($TP_{el,1}$, $TP_{el,2}$) pre-emphasizing the electrical PAM-n transmit signal ($TP_{el,1}$, $TP_{el,2}$) by digital filtering and using the pre-emphasized electrical PAM-n signal ($TP_{el,1}$, $TP_{el,2}$) as modulating signal for optically modulating an optical carrier signal, wherein the optical modulation method deployed is configured to create an optical PAM-n transmit signal ($TP_{opt,1}$, $TP_{opt,2}$) with a positive or negative chirp,
   (c) wherein, for initializing the optical transmission link, an initialization process is performed in which at least one loop comprising the following steps is run through:
      (i) creating, in the first optical transceiver, an optical PAM-n training transmit signal ($TP_{opt,1}$) and transmitting it to the second optical transceiver, the optical PAM-n training transmit signal ($TP_{opt,1}$) being created using an electrical PAM-n training transmit signal ($TP_{el,1}$) comprising a binary training sequence, wherein initial values for filter parameters are used for pre-emphasizing the electrical PAM-n training transmit ($TP_{el,1}$) signal and wherein an initial value is used for a chirp parameter that defines the positive or negative chirp of the optical PAM-n training transmit signal ($TP_{opt,1}$);
      (ii) receiving, in the second optical transceiver, the optical PAM-n training transmit signal ($TP_{opt,1}$) as an optical PAM-n training receive signal ($RP_{opt,1}$) using direct detection, wherein the optical PAM-n training receive signal ($RP_{opt,1}$) is converted into an electrical PAM-n training receive signal ($RP_{el,1}$);
      (iii) obtaining sampled values of the electrical PAM-n training receive signal ($RP_{el,1}$) by sampling this signal at predetermined points in time;
      (iv) using the sampled values obtained and corresponding sampled values of an ideal electrical PAM-n transmit signal to determine operating values for the filter parameters and an operating value for the chirp parameter, and
   (d) wherein the operating values for the filter parameters and the operating value for the chirp parameter are deployed during normal operation of the optical transmission link in the first optical transceiver.

2. The method according to claim 1, wherein the operating values for the filter parameters and the operating value for the chirp parameter are determined by the second optical transceiver and transmitted, via a communication channel, preferably an out-of-band communication channel, to the first optical transceiver, wherein the second optical transceiver knows the filter structure of the digital filter in the first optical transceiver and the ideal electrical PAM-n transmit signal ($TP_{el,1}$) or respective ideal sampled values.

3. The method according to claim 1, wherein the operating values for the filter parameters and the operating value for the chirp parameter are determined by the first optical transceiver, wherein the sampled values of the electrical PAM-n training receive signal are transmitted, via a communication channel, preferably an out-of-band communication channel, to the first optical transceiver.

4. The method according to claim 1, wherein the sampled values obtained and the ideal sampled values are used as input information for an algorithm that is configured to output operating values for the filter parameters, wherein, preferably, the sampled values obtained and the ideal sampled values are normalized.

5. The method according to claim 4, wherein the algorithm is a zero-forcing algorithm, wherein the loop comprising the steps of feature (c) is run through preferably only once.

6. The method according to claim 4, wherein the algorithm is a least mean square error (LMSE) algorithm, wherein the loop comprising the steps of feature (c) is run through multiple times until the mean square error between the sampled values obtained and the corresponding sampled values of the ideal electrical PAM-n transmit signal is interpreted as being a least mean square error, wherein this interpretation is made if the mean square error reaches a minimum or is lower than a predetermined threshold value or if the mean square error obtained in the current loop deviates from the mean square error obtained in the previous loop by less than a predetermined threshold value.

7. The method according to claim 4, wherein a change of the chirp parameter value is determined from a predetermined dependency of the chirp parameter from a remaining mean square error between the sampled values obtained and the corresponding sampled values of the ideal electrical PAM-n transmit signal that is determined when using the operating values for the filter parameters and keeping the initial operating value for the chirp parameter.

8. The method according to claim 7, wherein the predetermined dependency of the chirp parameter from the mean square error is obtained by a factory calibration process using an optical calibration transmission link comprising the first and second optical transceiver and two or more optical paths of known dispersion load or a single optical path comprising an adjustable dispersion component, or by simulating such a factory calibration process.

9. The method according to claim 8, wherein the factory calibration process comprises the steps of:
   determining, for two or more different CD loads, the respective operating values for the filter parameters using a selected algorithm, wherein the value for the chirp parameter is kept at a fixed value, preferably zero, and determining, for each CD load, the mean square error between the sampled values of the electrical PAM-n receive signal ($RP_{el,1}$), which are obtained by using an optical PAM-n transmit signal ($TP_{opt,1}$) that is created using the operating values for the filter parameters, and the sampled values of the ideal electrical PAM-n transmit signal ($TP_{el,1}$), and using the values for the mean square error and the known values for the CD loads for determining a relationship between the CD load and the mean square error;
   determining or measuring the bit error rate depending on the CD load and the chirp parameter at a predetermined constant value for the average power of an optical PAM-n receive signal ($RP_{opt,1}$),
   determining, for each of given values of the CD load, a value of the chirp parameter at which the bit error rate is at a minimum, and determining a relationship between the CD load and the chirp parameter using pairs of values each comprising a selected value for the CD load and a corresponding value for the chirp.

10. The method according to claim 1, wherein a Mach-Zehnder modulator is used in order to create the optical PAM-n transmit signal ($RP_{opt,1}$) with a positive or negative chirp and that the arm driving imbalance of the Mach-Zehnder modulator is used as the chirp parameter.

11. The method according to claim 10, wherein a bidirectional out-of-band communication channel is established between the first and second optical transceiver by low-frequency modulation of a bias voltage of the Mach-Zehnder modulator.

12. The bidirectional optical transmission link according to claim 1, comprising a first and a second optical transceiver at dedicated ends thereof and an optical transmission path connecting the first and second optical transceiver,
(a) wherein each of the first and second optical transceivers comprises a transmit signal converter configured to convert an electrical digital transmit ($T_{el,1}$, $T_{el,2}$) signal into an electrical PAM-n transmit signal ($TP_{el,1}$, $TP_{el,2}$) a digital filter connected to the transmit signal converter and being configured to pre-emphasize the electrical PAM-n transmit signal ($TP_{el,1}$, $TP_{el,2}$) by digital filtering and an electro-optical converter connected to the digital filter, the electro-optical converter comprising an optical source and being configured to use the pre-emphasized electrical PAM-n signal ($TP_{el,1}$, $TP_{el,2}$) as modulating signal for creating a correspondingly modulated optical PAM-n transmit signal ($TP_{opt,1}$, $TP_{opt,2}$), wherein the electro-optical converter is further configured to create the optical PAM-n transmit signal ($TP_{opt,1}$, $TP_{opt,2}$) with a positive or negative chirp,
(b) wherein each of the first and second optical transceivers comprises an opto-electrical converter configured to convert an optical PAM-n receive signal ($RP_{opt,1}$, $RP_{opt,2}$) into an electrical PAM-n receive signal ($RP_{el,1}$, $RP_{el,2}$), a signal detector connected to the opto-electrical converter and being configured to sample the electrical PAM-n receive signal ($RP_{el,1}$, $RP_{el,2}$) at predetermined sampling points in time so as to create sampled values of the electrical PAM-n receive signal ($RP_{el,1}$, $RP_{el,2}$), and a receive signal converter connected to the signal detector configured to convert the sampled electrical PAM-n received signal ($RP_{el,1}$, $RP_{el,2}$) into an electrical digital receive signal ($R_{el,1}$, $R_{el,2}$), and
(c) wherein each of the first and second optical transceivers comprises a control device, which is connected to the transmit signal converter, to the digital filter and the signal detector and which is configured to switch the optical transceiver into an operating mode or an initialization mode,
(d) wherein the control devices of the first and second optical transceivers are configured to perform, during an initialization process, the method according to claim 1, wherein the control device is configured to cause the transmit signal converter to create the electrical PAM-n training transmit signal ($TP_{el,1}$, $TP_{el,2}$), to determine operating values for the filter parameters, to feed values for filter parameters to the digital filter and to transmit sampled values of the electrical PAM-n training receive signal ($RP_{el,1}$, $RP_{el,2}$) or values for the filter parameters and/or values for the chirp parameter to the respective other optical transceiver.

13. The bidirectional optical transmission link according to claim 12, wherein the electro-optical converter comprises a Mach-Zehnder modulator, preferably a dual-drive Mach-Zehnder modulator, which is configured to optically modulate an optical CW carrier signal created by a laser.

14. The bidirectional optical transmission link according to claim 12, wherein the digital filter is a n-tap FIR filter, especially a 3-tap FIR filter.

15. The bidirectional optical transmission link according to claim 12, wherein the electro-optical converter is configured to create an out-of-band communication channel as a modulation component of an optical PAM-n transmit signal ($TP_{opt,1}$, $TP_{opt,2}$) for transmitting control information to the respective other optical transceiver.

* * * * *